(No Model.)
C. S. GARRIGUS.
Combination Tool.
No. 233,342. Patented Oct. 19, 1880.
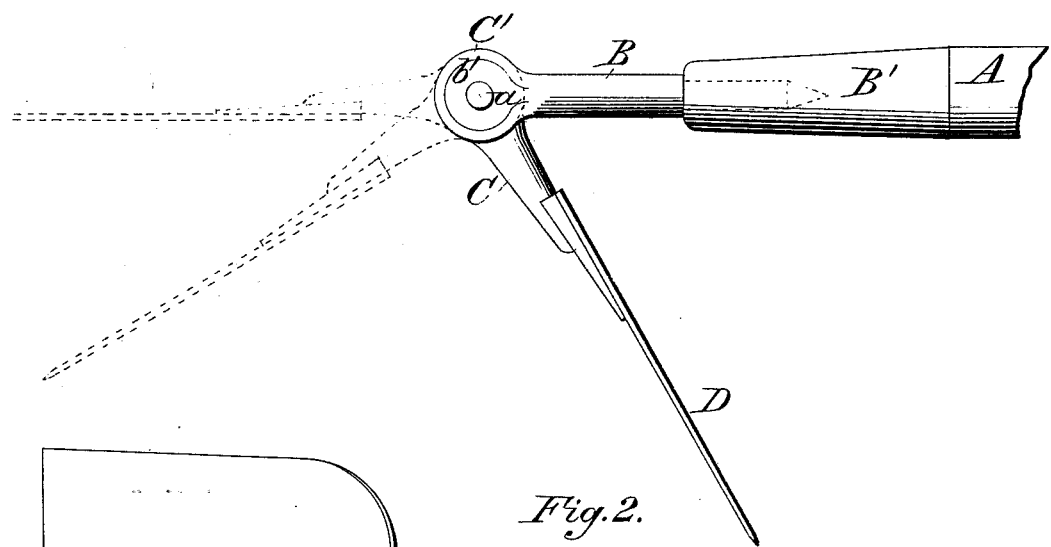
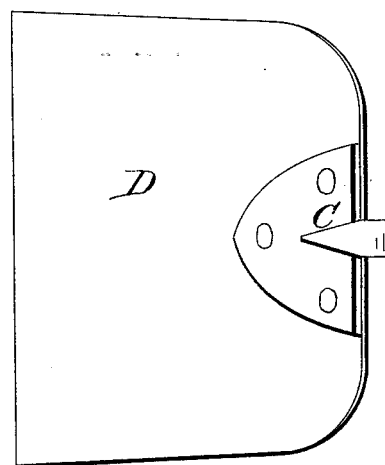
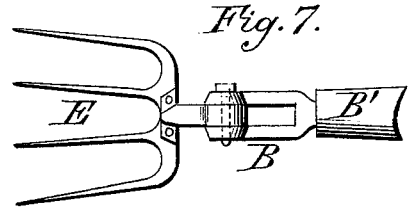
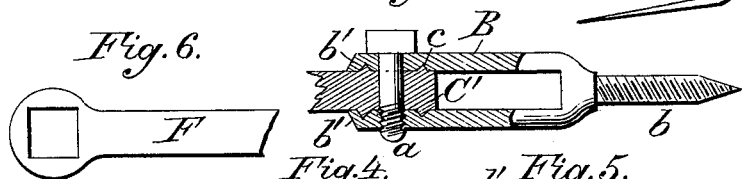
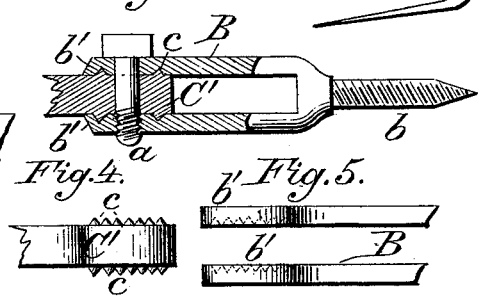
Attest:
F. H. Schott.
A. R. Brown.
Inventor:
Culberson S. Garrigus
by J. H. Tasker atty

UNITED STATES PATENT OFFICE.

CULBERSON S. GARRIGUS, OF WINCHESTER, VIRGINIA, ASSIGNOR OF ONE-HALF OF HIS RIGHT TO JOHN PURCELL, OF SAME PLACE.

COMBINATION-TOOL.

SPECIFICATION forming part of Letters Patent No. 233,342, dated October 19, 1880.

Application filed August 5, 1880. (No model.)

*To all whom it may concern:*

Be it known that I, CULBERSON S. GARRIGUS, a citizen of the United States, residing at Winchester, in the county of Frederick and State of Virginia, have invented certain new and useful Improvements in Combination-Tools; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my present invention is to provide for certain improvements in the combination agricultural implement for which Letters Patent No. 225,587 were granted to me March 16, 1880, and thus construct an implement that, by a more simple and durable adjustment than that shown in said patent, may be readily used as a hoe, shovel, scuffle-hoe, spade, scraper, edging-knife, or pruning-tool, as may be desired.

The invention consists in the method of adjusting the tang and blade to any desired position or at any angle with the handle by means of a knuckle-joint or connection composed of a bifurcated spring-shank and a tang-head, each having circular engaging-disks provided, respectively, with conical depressions and projections and firmly united by a screw-bolt, as hereinafter more fully described.

In the drawings, Figure 1 is an edge view of the implement with its blade adjusted at such an angle with the handle that it may be used as a hoe, as shown in full lines, or as a spade, shovel, or scuffle-hoe, as shown in dotted lines. Fig. 2 is a plan view with the blade arranged as a spade. Fig. 3 is a transverse section through the adjustable joint. Fig. 4 is an edge and side view of the enlarged tang-head. Fig. 5 shows edge and inner side views of the enlarged ends of the bifurcated spring-shank. Fig. 6 shows a wrench by means of which the several adjustments may be made; and Fig. 7 shows the adjustable tang arranged with a fork, pronged hoe, or potato-digger.

A represents the handle, which may be of any suitable length or material.

B is a bifurcated spring-shank, which is driven or screwed into the end of the handle and braced or bound by the ferrule B'. This ferrule or socket may, if desired, be made in one piece with the shank, when the screw-point $b$ on the latter may be dispensed with. The shank B is made of metal, and is provided with two spring-bifurcations having enlarged circular ends or disks $b'$. These disks are perforated to receive the bolt $a$, which also passes through a perforation in the tang-head C'. The tang C is made with an enlarged circular disk or head, C', provided with a series of conical projections, $c$, which, when the head or disk is in place, engage with the corresponding depressions $c'$ on the inner sides of the disks $b'$. A blade, D, or fork E is attached to the spread or flattened portion of the tang C, in the usual manner. The tang-head C' moves freely on the screw-bolt $a$ when the latter is loosened, and each conical projection $c$ finds a lodgment in a corresponding conical depression, $c'$, in the disk $b'$ at whatever angle the blade or tang may be adjusted.

It will thus be apparent that by the use of the wrench F the screw-bolt $a$ may be loosened or tightened and the implement adjusted at will to any desired angle or position, according to the nature of the work required or the height of the person using the implement.

It will also be observed that the tang C, together with the blade D or fork E attached thereto, may be reversed without removing the bolt $a$, and the wear brought, if desired, upon the opposite sides of the edge, thus causing the blade to become self-sharpening and increasing greatly the value of the implement. By tightening the bolt $a$ the conical projections $c$ are forced into the conical depressions $c'$, thereby securely holding the tang and attached blade or fork in position.

The implement constructed as above described is adapted to a great variety of uses, among which the following may be mentioned in addition to those hereinbefore referred to. When the blade is adjusted in a line parallel with the handle the implement may be used as a spade, a spud, an edging-knife, a sod-cutter, a wall or tree scraper, a pruning-tool, and as a tool that may be employed for cutting back strawberry runners or other vines. The blade may also be adjusted at such angles as to render it extremely useful in digging and removing the dirt from post-holes where an ordinary spade or shovel is not easily managed.

Having thus described my invention, what I claim as new, and desire to secure by Letters Patent, is—

The bifurcated spring-shank B, having a screw-point, $b$, and circular disks $b'$, provided with conical depressions $c'$, in combination with the screw-bolt $a$ and the tang C, having circular disk or head $C'$, provided with conical projections $c$, substantially as and for the purpose described.

In testimony whereof I affix my signature in presence of two witnesses.

CULBERSON S. GARRIGUS.

Witnesses:
A. R. BROWN,
F. H. SCHOTT.